(12) United States Patent
Greenwood et al.

(10) Patent No.: US 7,982,406 B2
(45) Date of Patent: Jul. 19, 2011

(54) ACTIVE LAMP CURRENT CREST FACTOR CONTROL

(76) Inventors: Simon Richard Greenwood, Altrincham (GB); Stephen Soar, Garstang (GB)

( * ) Notice: Subject to any disclaimer, the term of this patent is extended or adjusted under 35 U.S.C. 154(b) by 456 days.

(21) Appl. No.: 12/116,080

(22) Filed: May 6, 2008

(65) Prior Publication Data

US 2008/0278089 A1 Nov. 13, 2008

Related U.S. Application Data

(60) Provisional application No. 60/916,397, filed on May 7, 2007.

(51) Int. Cl.
*H05B 37/02* (2006.01)
(52) U.S. Cl. .......... 315/225; 315/307; 315/360
(58) Field of Classification Search .......... 315/209 R, 315/224–225, 247, 283, 291, 307, 360
See application file for complete search history.

(56) References Cited

U.S. PATENT DOCUMENTS

| | | | | |
|---|---|---|---|---|
| 5,063,331 A | * | 11/1991 | Nostwick | 315/219 |
| 5,914,572 A | * | 6/1999 | Qian et al. | 315/307 |
| 6,144,172 A | * | 11/2000 | Sun | 315/291 |
| 6,188,183 B1 | | 2/2001 | Greenwood et al. | |
| 6,384,544 B1 | | 5/2002 | Greenwood et al. | |
| 6,495,971 B1 | | 12/2002 | Greenwood et al. | |
| 6,593,703 B2 | * | 7/2003 | Sun | 315/224 |
| 6,791,285 B2 | | 9/2004 | Greenwood et al. | |
| 6,936,976 B2 | * | 8/2005 | Rudolph | 315/224 |
| 7,141,937 B2 | * | 11/2006 | Kumagai et al. | 315/224 |
| 7,411,360 B2 | * | 8/2008 | Henry | 315/307 |
| 2004/0032223 A1 | * | 2/2004 | Henry | 315/291 |
| 2006/0097652 A1 | * | 5/2006 | Van Casteren et al. | 315/209 R |
| 2006/0186831 A1 | * | 8/2006 | Newman et al. | 315/291 |
| 2007/0273304 A1 | | 11/2007 | Greenwood et al. | |

\* cited by examiner

*Primary Examiner* — Douglas W Owens
*Assistant Examiner* — Tung X Le
(74) *Attorney, Agent, or Firm* — Reinhart Boerner Van Deuren P.C.

(57) ABSTRACT

Ballasts with crest factor control are provided. During a transition to a given half cycle steady state, the current provided to reach the steady state is varied, such as turned off for a short period. This reduction during the transition may reduce or eliminate overshoot. The crest factor control is active, such as altering the timing or number of on/off/on switchings used to control crest factor. The active control may be based on any information, such as time, lamp voltage feedback, or other lamp dependent feedback.

22 Claims, 4 Drawing Sheets

ACTIVE LAMP CURRENT CREST FACTOR CONTROL

RELATED APPLICATIONS

The present patent document claims the benefit of the filing date under 35 U.S.C. §119(e) of Provisional U.S. Patent Application Ser. No. 60/916,397, filed May 7, 2007, which is hereby incorporated by reference.

BACKGROUND

The present embodiments relate to crest factor control. In electronic low frequency square wave lamp ballasts, such as high intensity discharge lamp ballasts, there often exists a problem caused by the parasitic resonances and time constants of the various internally connected inductive and capacitive elements. The lamp current may overshoot the desired nominal value of lamp current. FIG. 1 shows a square wave with the overshoot. FIG. 2 is an expanded view of a transition between half cycles of the square wave of FIG. 1. As the square wave transitions from one-half cycle of the lamp current to the opposite half cycle, the lamp current may overshoot the desired current level.

Lamp current overshoot is undesirable and may cause lamp electrode erosion, resulting in reduced lamp life. The sudden transient of current may cause magnetostrictive forces. These forces may cause acoustic noise in the various elements of a ballast's inductive components due to the sudden and high value changes in magnetic flux density. The current overshoot may also result in magnetostrictive movement of the internal lamp supporting structure, causing undesirable acoustic noise.

Overshoot may be limited by crest factor control. By turning a current source off for a period immediately after beginning the half cycle, the amount of overshoot may be limited. However, overshoot may continue to be a problem at different times during or after lamp warm-up or for different lamps.

BRIEF SUMMARY

The present invention is defined by the following claims and nothing in this section should be taken as a limitation on those claims. By way of introduction, the preferred embodiments described below include systems, methods, and ballasts for active crest factor control. During a transition to a given half cycle steady state current, the on/off mark-to-space ratio switching of the active switch provided to reach the steady state current is varied. This variation in on/off switching ratio during the transition may reduce or eliminate overshoot. Different half cycles may have different on/off mark-to-space ratios to account for lamp voltage or other lamp dependent factor.

In a first aspect, a method is provided for controlling crest factor in lamp current. Cyclical lamp current is provided. A momentary reduction in current demand signal is inserted from a control circuit during a portion of an active half cycle such that an overshoot of the cyclical lamp current is reduced or eliminated. The inserting is altered as a function of a lamp dependent factor, such as lamp voltage.

In a second aspect, a method is provided for controlling crest factor in lamp current. A first switch connecting a lamp via an inductor to a first voltage rail is turned off at the end of a first half cycle. A second switch connecting the lamp via another or the same inductor to a second voltage rail of opposite polarity to the first voltage rail is turned on, for a first time, at the beginning of a second half cycle. The turning off of the first switch and turning on of the second switch corresponds to transitioning from the first half cycle to the second half cycle. After turning on the second switch the first time, the second switch is turned off during a portion of the second half cycle. This turning off of the second switch may be repeated several times during a portion of the second half cycle. The turning off of the second switch during the second half cycle is adjusted, such as adjusting the timing or number of turn-offs during the second half cycle as a function of lamp voltage or other lamp dependent factor.

In a third aspect, a lighting ballast is provided for controlling crest factor in lamp current. First and second switches are operable to connect and disconnect a lamp via an inductor or inductors to a first and second voltage rails. A controller is operable to cause the first switch to connect the lamp via an inductor to the first voltage rail during a first half cycle and the second switch to connect the lamp via and inductor to a second voltage rail of opposing polarity during a second half cycle. The second switch and the first switch disconnect the lamp via an inductor or inductors from the first and second voltage rails respectively during the first and second half cycles, respectively. The controller is operable to cause the first switch to disconnect the lamp during the first half cycle and after a beginning of the first half cycle. A feedback is provided from the lamp to the controller. The controller is operable to set a characteristic of the disconnect as a function of the feedback.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Lamp current crest factor control controls edge transition overshoot of lamp current. The control is implemented by controlling the switching of the ballast output stage during and/or immediately after the transition of lamp current from one polarity to the opposite polarity. The control is performed with software, but hardware or triggering circuits may be used. To account for differences in operation of a lamp over time, the crest factor control may be active or operates based on feedback. The parameters, such as timing or number of on/off cycles within a given half cycle, may be set as a function of a lamp dependent factors, such as lamp voltage.

Figure 1:
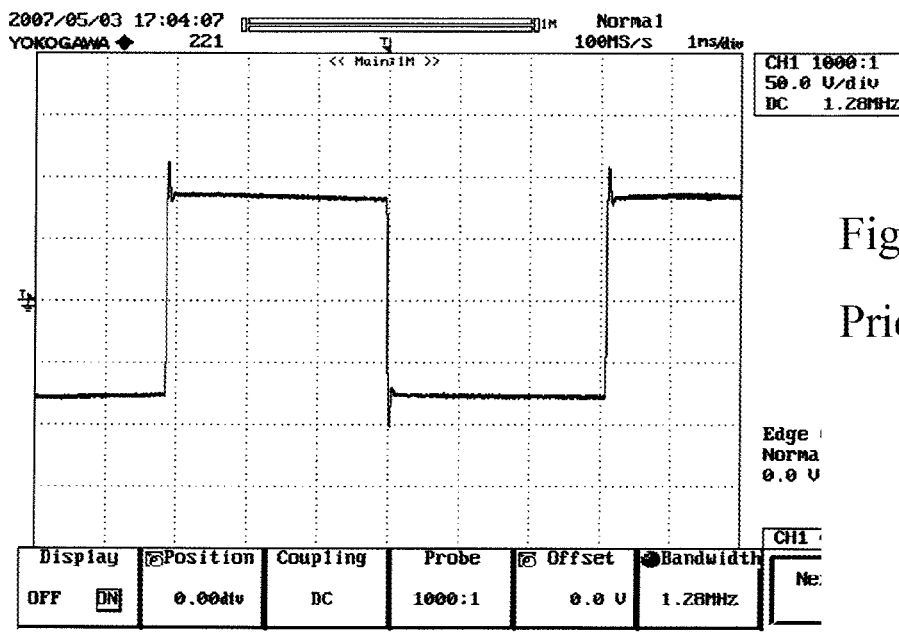
FIG. 1 is an example oscilloscope screen of a square wave lamp current with overshoot.
Figure 2:
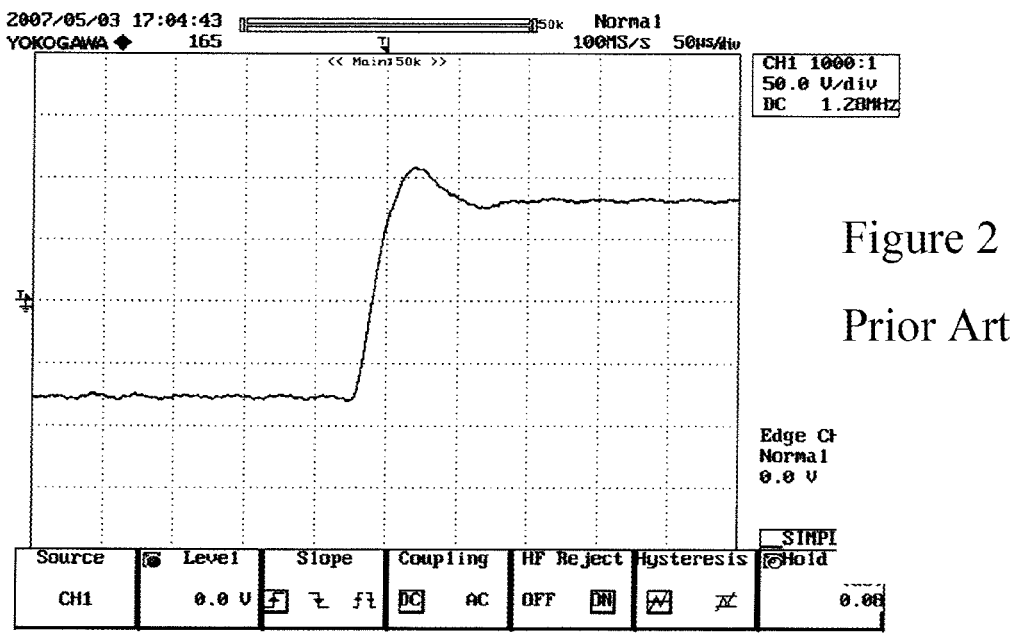
FIG. 2 is an expanded view of the overshoot of FIG. 1.

A ballast converts mains power into a lamp current, such as a low frequency square wave lamp current. Any frequency may be used. The square wave may include other waveforms or not be perfectly square, such as represented in FIG. 2 where the square wave includes a higher frequency ripple and the transition is not instantaneous. Waveforms with or without high frequency ripples may be used. Other waves than square waves may be used.

The ballast is a lighting ballast, such as a high intensity discharge, fluorescent, or other now known or later developed lighting ballast. For example, the ballast is one of the ballasts shown in U.S. Pat. Nos. 6,188,183, 6,495,971, or 6,384,544, or U.S. Published Patent Application No. 2007-0273304, the disclosures of which are incorporated by reference herein. The ballast may be a different type of ballast, such as ballasts described in the background sections of the above referenced disclosures or other ballasts. Other high intensity discharge lamp ballast circuit topologies, now known or later developed, may be used.

Using the ballast shown in FIG. 2 of U.S. Published Patent Application No. 2007-0273304 with no overshoot current control, the natural resonances of the first and second stage output inductors with the first stage capacitor and to a lesser degree the output resonant capacitor cause the current seen at the lamp to overshoot the nominal lamp current, causing a spike of current. In full bridge ballasts, such resonances may occur in the bridge capacitor and output inductor or ignitor transformer or other L and C circuits however connected to the lamp.

The control of such currents is complex and dependent upon many factors. Lamp voltage and lamp types may give rise to various damping factors on the resonances, and different inductor and capacitor values affect the Q of the circuit and the resonant frequencies of the L and C components interaction. Immediately after lamp ignition, the lamp voltage may be low, resulting in a relatively low damping factor. As the lamp warms up, the lamp voltage increases resulting in the damping factor increasing. The control function of the software or hardware may be altered in response to the measured lamp voltage or other lamp dependant factors, for instance, thermal time constant of the arc. The crest factor control may be set, adjusted, or altered as a function of feedback or time.

Figure 3:
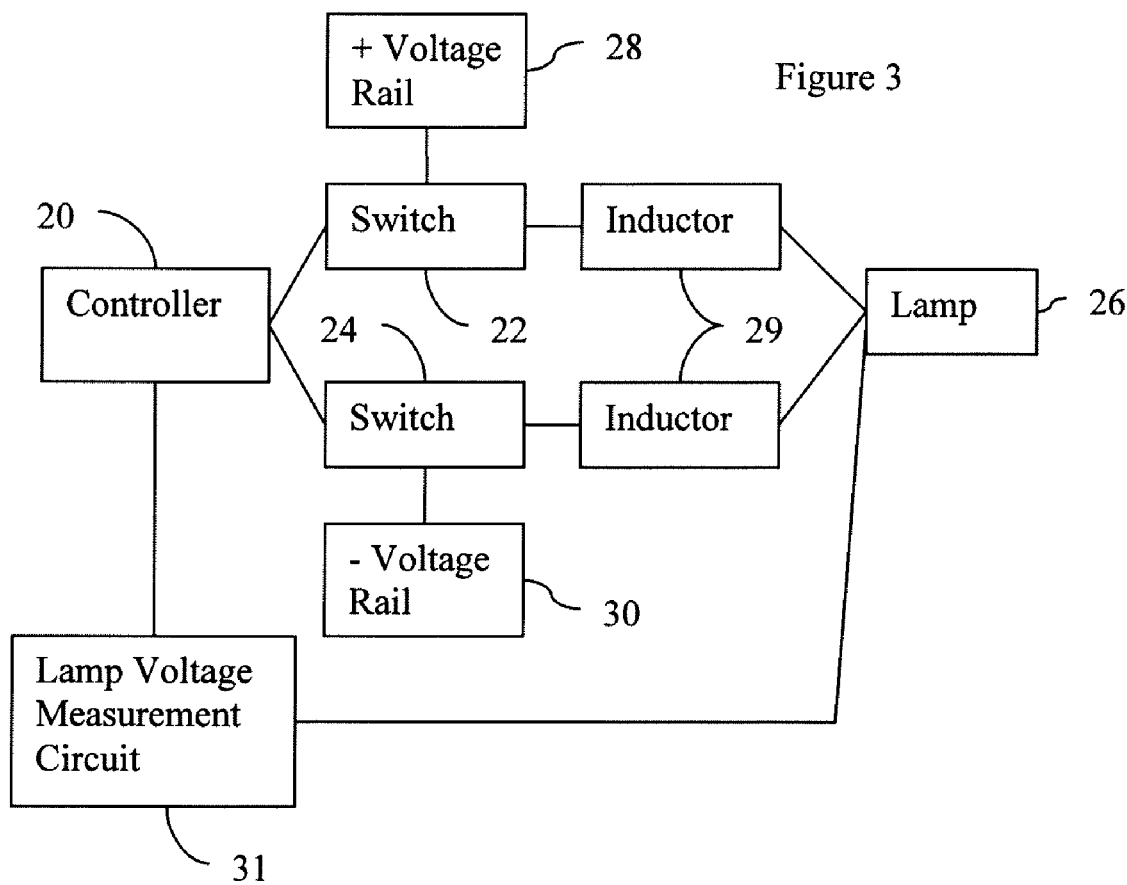
FIG. 3 is a block diagram of one embodiment of a lighting ballast for crest factor control.

FIG. 3 shows one embodiment of a lighting ballast for actively controlling crest factor in lamp current. FIG. 3 is a simplification of a lighting ballast. Other structures with additional or different switching arrangements may be used. Other lighting ballasts may be used. Additional, different, or fewer components may be provided.

First and second switches 22 and 24 are operable to connect a lamp 26 to a first and second voltage rails 28 and 30 through a respective inductor 29. Any network or inductor configuration may be used, such as a further common inductor connected in series between the respective inductors 29 and the lamp 26. The switches 22 and 24 connect the respective inductor 29 to positive and negative voltage rails 28 and 30, respectively, or voltage rails with different potential, such as opposite polarity. The operation of the switches 22, 24 in association with the corresponding inductor 29 acts as a current source for each half cycle.

A controller 20 is operable to cause the first switch 22 to cyclically connect and disconnect in a mark to space ratio the lamp 26 to the first voltage rail 28 through an inductor 29 so as to control the lamp current value during a first half cycle and the second switch 24 to cyclically connect and disconnect in a mark to space ratio the lamp 26 to the second voltage rail 30 through an inductor 29 so as to control the lamp current value during a second half cycle. The second switch 24 and the first switch 22 disconnect the respective inductor 29 from the voltage rails 30 and 28 during the first and second half cycles, respectively. Only one switch is operated in this controlled mark to space ratio in a given half cycle of lamp current. By cycling through these connections, a current controlled square wave is provided to the lamp 26.

The control of the switches 22, 24 controls the current in the inductors 29, and, therefore, in the lamp 26. The switching is altered such that the current in the corresponding inductor 29 is modified during −ve to +ve transitions and +ve to −ve transitions to ensure the lamp current does not overshoot. The controller 20 is operable to cause the first switch 22 to disconnect the positive voltage rail 28 from the respective inductor 29 during the first half cycle and after a beginning of the first half cycle. This may limit overshoot at the beginning of the first half cycle. The controller 20 is also operable to cause the second switch 24 to disconnect the lamp 26 the negative voltage rail 30 from the respective inductor 29 during the second half cycle and after a beginning of the second half cycle. This may limit the overshoot at the beginning of the second half cycle. For the respective half cycles, the controller 20 is operable to cause the switch 22, 24 to connect to transition to the next half cycle and operable to cause the switch 22, 24 to disconnect and then reconnect the lamp 26 and the inductor 28 during the transition. The switch 22, 24 repetitively disconnects and connects during a transition to the half cycle. A beginning of the transition is the beginning of the half cycle.

The controller 20 controls the switches 22, 24 actively, such as varying the crest factor control as a function of time. In one embodiment, the variation is based on feedback, such as using the lamp voltage measurement circuit 31. The crest factor control is active or varies as a function of a lamp dependent factor. Any lamp dependent factor may be used, such as thermal time constant of the arc and/or lamp voltage. Lamp voltage may be a voltage directly across the lamp 26 or a lamp voltage associated with the lamp 26, such as at an inductor connecting the lamp 26 with both the inductors 29.

The controller 20 sets the timing, number of on/off switches in a half cycle, or other characteristic of the crest factor control. For example, the start time, duration of off time, end time, or combinations thereof are set as a function of lamp voltage. Lower voltages may be associated with less overshoot, so less "off" time during a half cycle is provided. The crest factor control may be set differently at different times, so is adjusted or altered as a function of time.

In one embodiment, the controller 20 actively controls the crest factor control based on the feedback of lamp voltage. The lamp voltage measurement circuit 31 includes resistors to form a potential divider. The reduced voltage is input to an analog-to-digital converter separate from or included in the controller 20. The input to the analog-to-digital converter may be decoupled to 0 volts by a capacitor or other path for high frequency noise to ground. This may prevent the analog-to-digital converter from sampling any noise on the potential divider. The input of the potential divider is connected to a node of three inductors (e.g., inductors 29 and an inductor connected in series with the inductors 29 and the lamp 26) and a capacitor. The average voltage at this node at a fixed time, such as half way into each half cycle, is proportional to the lamp arc voltage. The potential divider reduces this voltage to a level that the controller 20 can read. The controller 20 uses the lamp arc voltage to set or alter the settings of the crest factor control. Other lamp voltage measurement circuits may be used.

Figure 4:
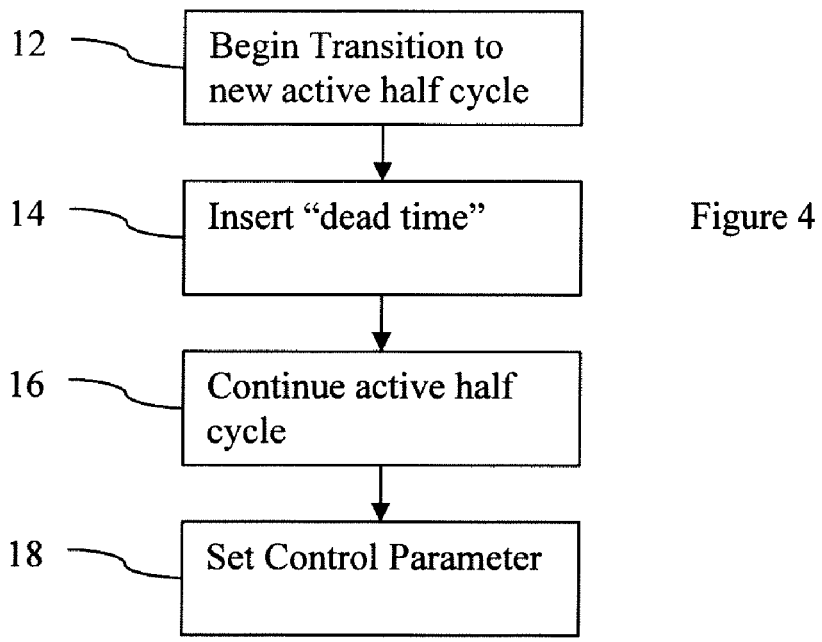
FIG. 4 is a flow chart diagram of one embodiment of a method for crest factor control in lamp current.

FIG. 4 shows a method for controlling crest factor in lamp current. Additional, different, or fewer acts may be provided to control the overshoot. The acts are performed in the order shown or a different order.

To limit or eliminate the overshoot, the switching is controlled. An extra "dead time" or OFF time is inserted into the active half cycle. For example, a cyclical lamp current is provided. In one embodiment, the lamp current is a bi-polar square wave provided to a high intensity discharge lamp. A reduction in current demand is inserted during a portion of an active half cycle. For example, a switch connecting the lamp is turned off. The switch and the inductor form a current source. The on/off switching of the switch causes the current in the inductor to ramp up and down respectively between desired levels. The on/off time is controlled in response to a control circuit which varies the ratio of on/off times of the switch to control the average value of current in the inductor. The inductor is serially connected to the lamp and therefore controls the average value of current in the lamp in a given half cycle of square wave. The switch is turned off during a portion of the active half cycle such that an overshoot of the cyclical lamp current is reduced or limited.

In one embodiment, the active output transistor (e.g., switch for the positive half cycle) is held in the OFF state for a portion of the active waveform (e.g., a portion of the positive half cycle). The start and finish, existence, and/or length of the dead time relative to the transition of the lamp current from one level to another level (e.g., from one polarity to the opposite polarity) is controlled.

For example, the waveform is in the negative half cycle. At the end of the negative half cycle, the switch for the negative half cycle is turned off. This switch connecting the lamp to a negative current level is turned off at the end of the half cycle.

After a time, such as a few microseconds, the switch for positive voltage is turned on to begin the transition to the positive half cycle in act 12. The switch connecting the lamp to a different current level is turned on at the beginning of a half cycle. The turning off of the switch for negative voltage and turning on of the switch for the positive voltage transitions from one-half cycle to another half cycle. Positive and negative are used as examples, such as where a bi-polar square wave provides equal current levels but with opposite polarity. Other embodiments use two or more different positive or different negative levels.

After turning on the switch for the positive half cycle a first time, the current source is disconnected or changed in act 14. For example, the switch for the positive half cycle is turned off during a portion of the positive half cycle. In about 50 microseconds without crest factor control, the waveform transitions to the positive value, with an undesired crest or spike. To control the crest, the switch for the positive voltage is turned on in act 12, and then turned off in act 14.

The switch for the positive half cycle is then turned on again or the current source is increased in act 16. Instead of just being turned on for the entire half cycle, the switch is turned on for transition, turned off during the transition and then turned on again, creating a dead time during the beginning of the half cycle. In one embodiment, the switch is on for 10-40 microseconds, then turned off for 5-20 microseconds ("dead time"), and then turned on again. The dead time may be repeated for the same half cycle. Other lengths of time may be used, including times within or outside of the ranges given above. The switching is controlled by software and the switch controller or by hardware. The process is repeated for other transitions, including transitions to the negative half cycle from the positive half cycle.

The "dead times" alter the energy input over time characteristic of the resonant inductors and capacitors such that the overshoot of current is controlled to a desired level. A multiplicity of "dead times" and/or timing of the start and finish of such dead times relative to the transition of lamp current from one polarity to the opposite polarity may be used.

Figure 5:
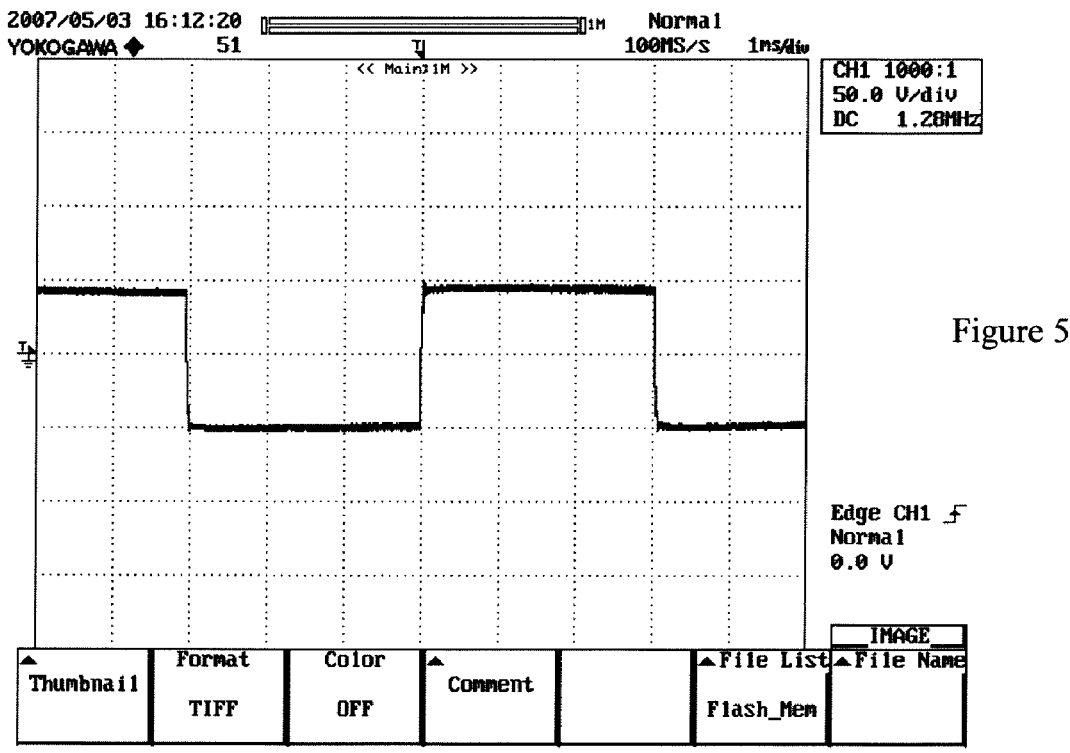
FIG. 5 is an example oscilloscope screen of a square wave lamp current without or with limited overshoot.
Figure 6:
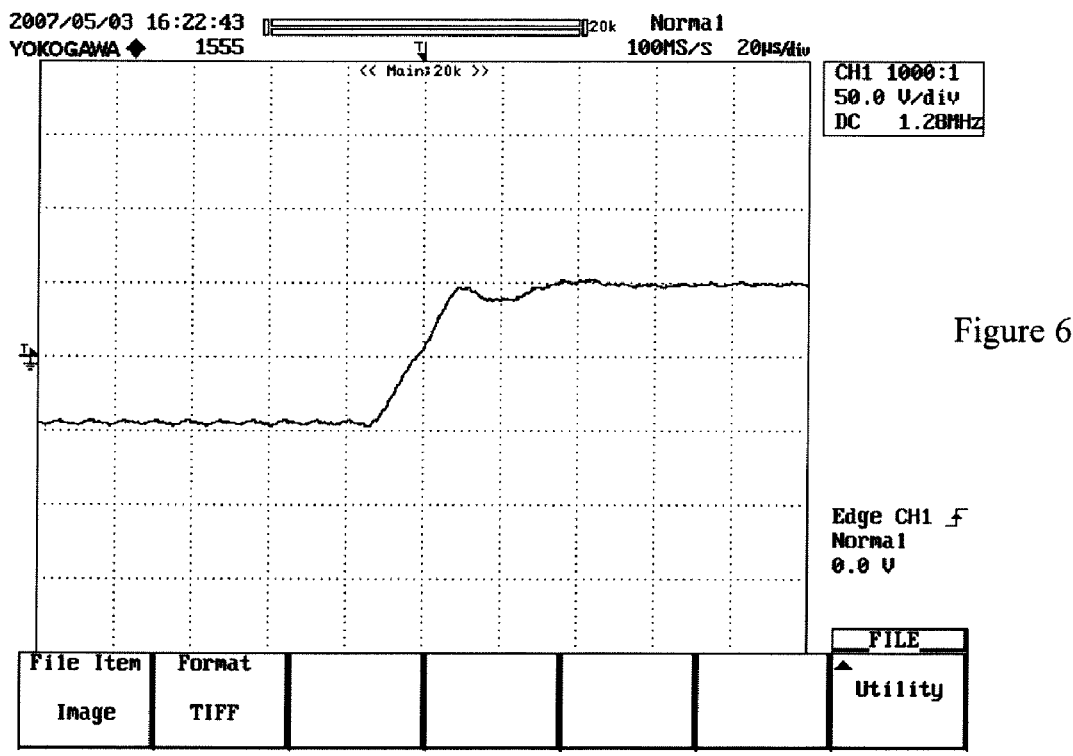
FIG. 6 is an expanded view of a transition without or with limited overshoot in the square wave of FIG. 5.

FIG. 5 shows an example of a square wave with crest factor control. The overshoot is limited. FIG. 6 shows an expanded view of a transition in the example waveform of FIG. 5. Little or no overshot occurs due to the dead time inserted in the transition or beginning of the half cycle. A sag or undershoot may result. Variation of the dead time may provide a trade off between amount of overshoot, amount of sag or undershoot, and timing of either.

Referring again to FIG. 4, the crest factor control parameters are set in act 18. The off/on timing and/or number of off cycles in a given half cycle is set. For example, feedback indicating a lamp voltage is used to change the timing used for crest factor control in the subsequent half cycle.

Figure 7:
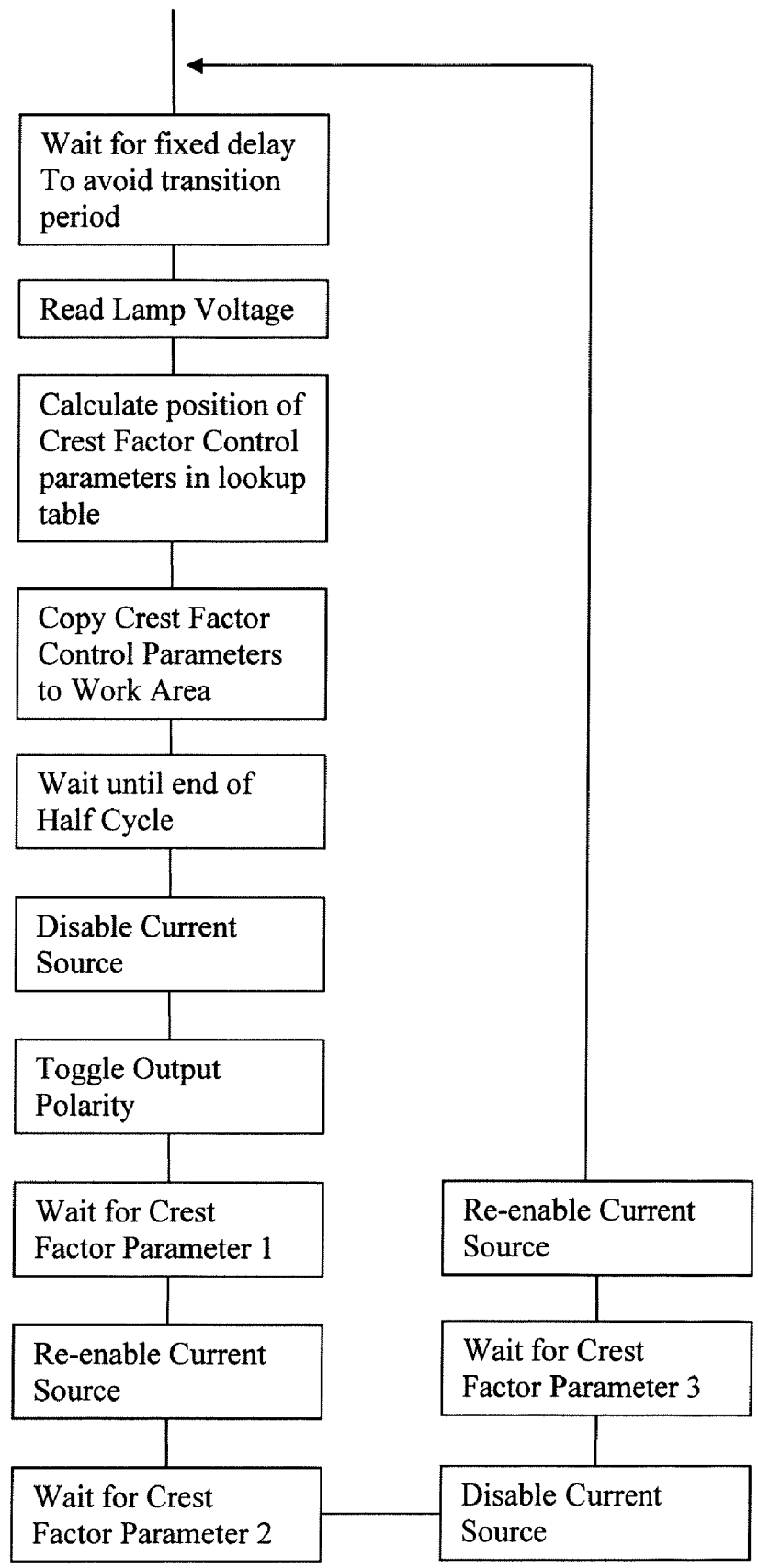
FIG. 7 is a flow chart diagram of one embodiment of a method for active crest factor control.

FIG. 7 shows one embodiment for actively controlling the crest factor control. Other embodiments may be provided. To actively control the crest factor, a feedback measurement is provided. The measurement may occur at any time. For example, the measurement is performed once every half-cycle of the lamp drive voltage at a fixed period into the half-cycle. The controller waits until the mid point or other time in each half cycle to measure. Other measurement frequencies may be used, such as every other half cycle or less. The lamp voltage or other lamp dependent factor is measured at the desired time. Any measurement may be made.

The measured value alone or in combination with other measured values is used to calculate control parameters. For example, an average of the most recent measurements or different types of measured values are input to a look-up table. Based on the inputs, one or more parameters for crest factor control are selected. For example, the duration of each of a first off portion, a second on portion, and a second off portion for crest factor control are selected. Other timing and/or number of off cycles within the half cycle may be set.

The selected parameters values are copied to or otherwise used by the crest factor controller, such as a switch controller. After altering the values by replacing previous values with new values, the control operates to provide crest factor control. The control with the recently provided settings is performed for the subsequent half cycle or cycles.

The crest factor control operation occurs at every output voltage half-cycle transition. After starting the half cycle, such as enabling the current source with an opposite polarity than the last half cycle, the current source is disabled (switched off). The current source is disabled at a fixed or variable time after the initiation of the half cycle. After waiting a first delay period of off time, the current source is re-enabled. The first delay period is a parameter set as a function of the previous lamp voltage or other feedback. After a second delay period with the current source on, the current source is disabled again. The second delay period is a parameter set as a function of the previous lamp voltage or other feedback. After a third delay period, the current source is re-enabled for the remainder of the current half cycle. The third delay period is a parameter set as a function of the previous lamp voltage or other feedback. More disable—wait, enable—wait cycles may be added to improve the fineness of the control. One or more crest factor control on/off/on transitions may be fixed, such as actively controlling one but not another.

While the invention has been described above by reference to various embodiments, it should be understood that many changes and modifications can be made without departing from the scope of the invention. It is therefore intended that the foregoing detailed description be understood as an illustration of the presently preferred embodiment of the invention, and not as a definition of the invention. It is only the following claims, including all equivalents, which are intended to define the scope of this invention.

We claim:

1. A method for controlling crest factor in lamp current, the method comprising;
   providing cyclical lamp current;
   inserting a reduction in current demand during a portion of an active half cycle such that an overshoot of the cyclical lamp current is reduced; and
   altering the inserting as a function of a lamp dependent factor;
   wherein inserting the reduction comprises turning off a switch connecting the lamp to a current source, the current source providing a reference current for the active half cycle, the switch being turned off during the active half cycle.

2. The method of claim 1 wherein inserting comprises limiting transition overshoot of the cyclical lamp current.

3. The method of claim 1 wherein providing comprises providing a bi-polar square wave to a high intensity discharge lamp.

4. The method of claim 1 wherein altering comprises altering as a function of lamp voltage.

5. The method of claim 1 wherein altering comprises altering as a function of a thermal time constant of an arc.

6. The method of claim 1 wherein altering comprises altering a timing of the portion.

7. The method of claim 1 wherein altering comprises altering a number of repetitions of the inserting in a half cycle.

8. A method for controlling crest factor in lamp current, the method comprising:
   turning off a first switch connecting a lamp to a first voltage rail at an end of a first half cycle;
   turning on, a first time, a second switch connecting the lamp to a second voltage rail different than the first voltage rail at a beginning of a second half cycle, the turning off of the first switch and turning on of the second switch corresponding to transitioning from the first half cycle to the second half cycle;
   turning off, after turning on the second switch the first time, the second switch during a portion of the second half cycle; and
   adjusting the turning off of the second switch during the second half cycle.

9. The method of claim 8 further comprising:
   turning on, after turning off the second switch, the second switch a second time during the second half cycle, the turning off and turning on the second time of the second switch comprising a dead time during the second half cycle.

10. The method of claim 9 wherein the dead time is about 5-20 microseconds.

11. The method of claim 10 wherein a time between turning on the second switch the first time and turning off the second switch is about 10-40 microseconds.

12. The method of claim 9 further comprising providing an additional dead time during the second half cycle.

13. The method of claim 8 wherein the first voltage rail is a same magnitude as the second voltage rail but with opposite polarity.

14. The method of claim 8 wherein adjusting comprises adjusting as a function of feedback.

15. The method of claim 14 wherein adjusting as a function of feedback comprises adjusting as a function of a lamp voltage.

16. The method of claim 8 wherein adjusting comprises changing a timing of a beginning of the portion, of an end of the portion, of a duration of the portion, or combinations thereof.

17. A lighting ballast for controlling crest factor in lamp current, the lighting ballast comprising:
   first and second switches operable to connect and disconnect a lamp;
   a controller operable to cause the first switch to connect the lamp during a first half cycle and the second switch to connect the lamp during a second half cycle, the second switch and the first switch disconnecting the lamp during the first and second half cycles, respectively, wherein the controller is operable to cause the first switch to disconnect the lamp during the first half cycle and after a beginning of the first half cycle; and
   a feedback from the lamp to the controller, the controller operable to set a characteristic of the disconnect as a function of the feedback.

18. The lighting ballast of claim 17 wherein the controller is operable to cause the second switch to disconnect the lamp during the second half cycle and after a beginning of the second half cycle.

19. The lighting ballast of claim 17 wherein the controller is operable to cause the first switch to connect to transition to the first half cycle, and operable to cause the first switch to disconnect and then reconnect the lamp during the transition.

20. The lighting ballast of claim 17 wherein the controller is operable to cause the first switch to repetitively disconnect and connect during a transition to the first half cycle, a beginning of the transition being the beginning of the first half cycle.

21. The lighting ballast of claim 17 wherein the first and second switches are operable to connect and disconnect the lamp by connecting inductors to positive and negative voltage rails, respectively, the inductors, when connected, comprising current sources to the lamp.

22. The lighting ballast of claim 17 wherein the feedback comprises a voltage measuring circuit.

* * * * *